(12) United States Patent
Linglet

(10) Patent No.: US 6,736,625 B1
(45) Date of Patent: May 18, 2004

(54) BLOWING MACHINE WITH DOUBLE CAVITY MOULDS

(75) Inventor: Stephane Linglet, Le Havre Cedex (FR)

(73) Assignee: Sidel, Le Havre Cedex (FR)

(*) Notice: Subject to any disclaimer, the term of this patent is extended or adjusted under 35 U.S.C. 154(b) by 125 days.

(21) Appl. No.: 10/018,474

(22) PCT Filed: Jul. 3, 2000

(86) PCT No.: PCT/FR00/01879
§ 371 (c)(1),
(2), (4) Date: Jun. 14, 2002

(87) PCT Pub. No.: WO01/02157
PCT Pub. Date: Jan. 11, 2001

(30) Foreign Application Priority Data

Jul. 5, 1999 (FR) .............................. 99 08817

(51) Int. Cl.[7] .................... B29C 49/12; B29C 49/58; B29C 49/36
(52) U.S. Cl. .................... 425/182; 425/529; 425/535; 425/540
(58) Field of Search ................ 425/182, 529, 425/535, 540

(56) References Cited

U.S. PATENT DOCUMENTS

| 5,551,860 A | 9/1996 | Budzynski et al. |
| 6,394,781 B1 * | 5/2002 | Lee ............................ 425/533 |
| 6,450,795 B1 * | 9/2002 | Fields et al. ................ 425/182 |

FOREIGN PATENT DOCUMENTS

| EP | 0 858 878 A | 8/1998 |
| FR | 1 308 594 A | 2/1963 |
| FR | 2 709 264 A | 3/1995 |

* cited by examiner

Primary Examiner—Robert B. Davis
(74) Attorney, Agent, or Firm—Sughrue Mion, PLLC

(57) ABSTRACT

A rotary machine for blowing thermoplastic containers starting with a previously injected preform, comprising several blowing stations (10) each of which can bear a double cavity mould (16), wherein each station includes a blowing unit (26) which is fixed on a mount frame element (22) and provided with two blow nozzles (24). The machine can be transposed into a single cavity configuration wherein each station bears a single cavity mould (36), and the blowing unit (26) includes a second position for being fixed on the mount frame element wherein one of the nozzles (24) is arranged to correspond with the main axis (A4) of the single moulding cavity (38) of the single cavity mound (36).

6 Claims, 4 Drawing Sheets

BLOWING MACHINE WITH DOUBLE CAVITY MOULDS

Figure 1:
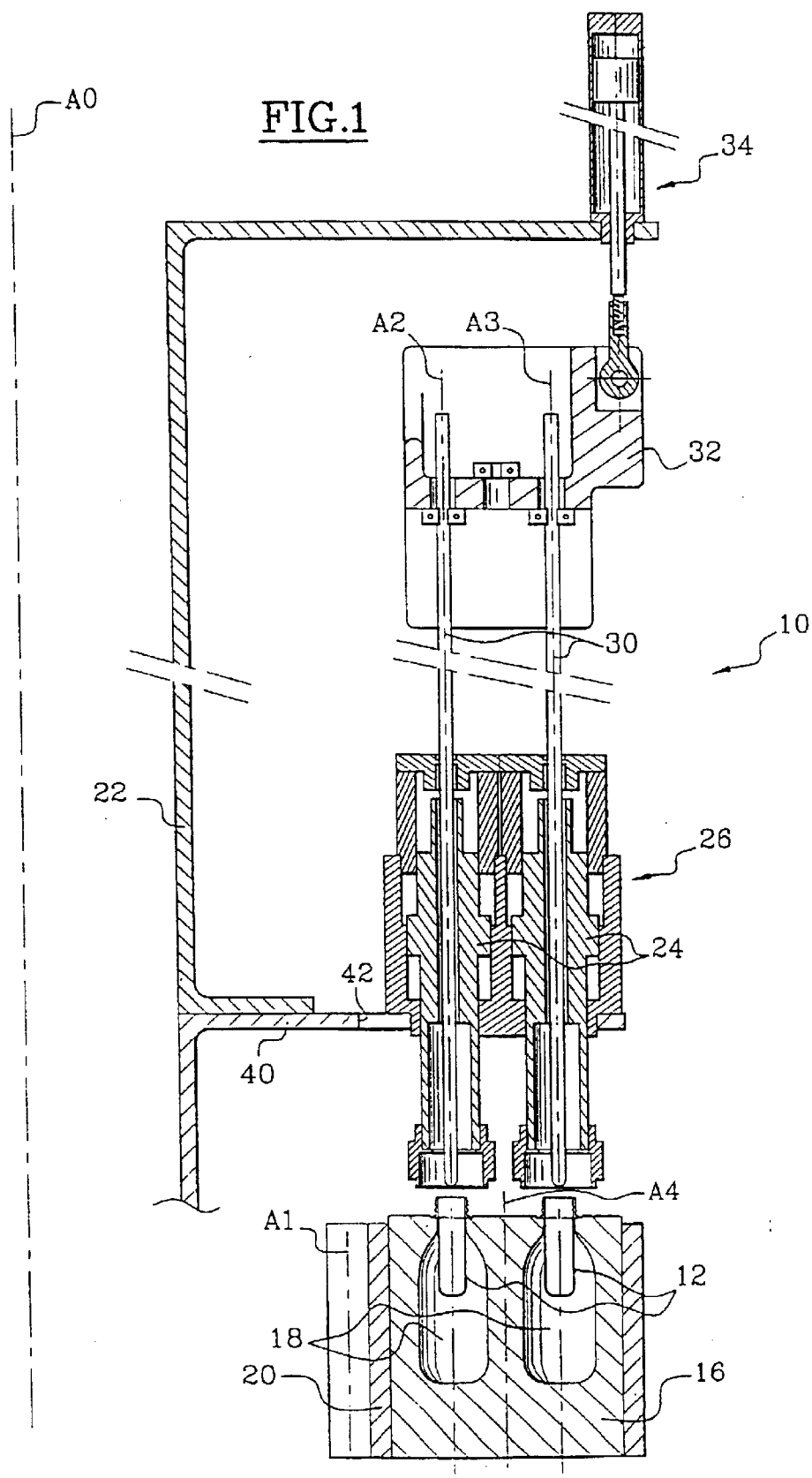

The invention concerns rotary machines for blow-molding containers made of thermoplastic material in which the container is obtained by blow-molding a preform previously produced by injection molding.

More particularly, it concerns machines having at least one blow-molding station in which a mold carrier unit carries a two-impression mold having two mold cavities each of which is intended to receive one preform. In this case the blow-molding station comprises a blow-molding unit provided with two blow-molding nozzles that are movable between a retracted position and a blow-molding position in which the nozzles can inject the fluid under pressure into the preforms in order to blow-mold the containers. To do this, the blow-molding unit is mounted on a frame element of the blow-molding station in such a way that the two nozzles are placed on either side of a central axis of the mold carrier unit, in correspondence with the principal axes of the two blow-molding cavities.

The invention will be more particularly intended to be implemented on rotary machines comprising several blow-molding stations arranged on a rotor driven in continuous rotational movement. These rotary machines make it possible to achieve high rates of production. The design of two-impression machines, in which each blow-molding station can proceed with the simultaneous blow-molding of two containers, makes it possible to increase the production rate even more while decreasing the unit price of the containers thus produced.

However, the containers that can be manufactured with these two-cavity molds are small in volume. Indeed, the size of the two containers is limited by the size of the mold, which in turn is limited by the size of the mold carrier unit. But mold-carrier units that are too large in size can not be loaded on a rotary machine because this would result in excessively increasing the inertia of the machine's rotor. Thus, in the high-speed rotary machines that are currently known, the maximum volume of the containers that can be produced in a two-impression mold is less than one liter.

As it happens, however, in many cases the products that are sold in such containers, particularly drinks, are sold in containers of different sizes. Thus, a producer may wish to have containers of different formats, but in every case these containers must be produced under the most advantageous conditions.

Nonetheless, until now, in order to produce low cost containers, it was necessary to have two types of machines: one two-impression machine for small-volume containers, and one one-impression machine for larger containers.

In order to remedy this, a purpose of the invention is to propose a new design of a blow-molding machine that makes it possible to produce both types of containers at the lowest cost, the same machine being able to be configured to produce one or two containers per blow-molding station, without requiring excessive modifications of the machine to change over from one type of production to the other.

To accomplish this, the invention proposes a machine of the type previously described, characterized in that the machine can be changed over to a one-impression configuration in which the mold-carrier unit carries a one-impression mold comprising a single mold cavity the axis of which is appreciably the same as the principal axis of the mold-carrier unit, and in that the blow-molding unit has a second mounting position on the frame element in which the first of two nozzles, called the active nozzle, is arranged in correspondence with the principal axis of the only molding cavity of the one-impression mold.

According to other characteristics of the invention:

the blow-molding unit is moved by sliding between its two mounting positions on the frame;

the blow-molding station has means for inhibiting the second nozzle, called the passive nozzle, so that it is isolated from the source of pressurized fluid;

both nozzles are fed by pressurized fluid from a common source through a distributor that is incorporated into the blow-molding unit, and the distributor has means for isolating the passive nozzle from the source of pressurized fluid;

the nozzles are movable with respect to the blow-molding unit between a retracted position and a blow-molding position, and in the one-impression configuration the second nozzle, called the passive nozzle, is immobilized in a retracted position;

during the blow-molding, each preform is drawn with a drawing rod which is axially engaged inside the preform, through the respective blow-molding nozzle; the blow-molding station has a drawing carriage that is guided axially on the frame element; the carriage has a first and second mounting location each intended to receive a drawing rod when the machine is in the two-impression configuration, and a third mounting location that is used exclusively to receive a drawing rod when the machine is in the one-impression configuration, said location being aligned with the principal axis of the mold carrier unit.

Figure 2:
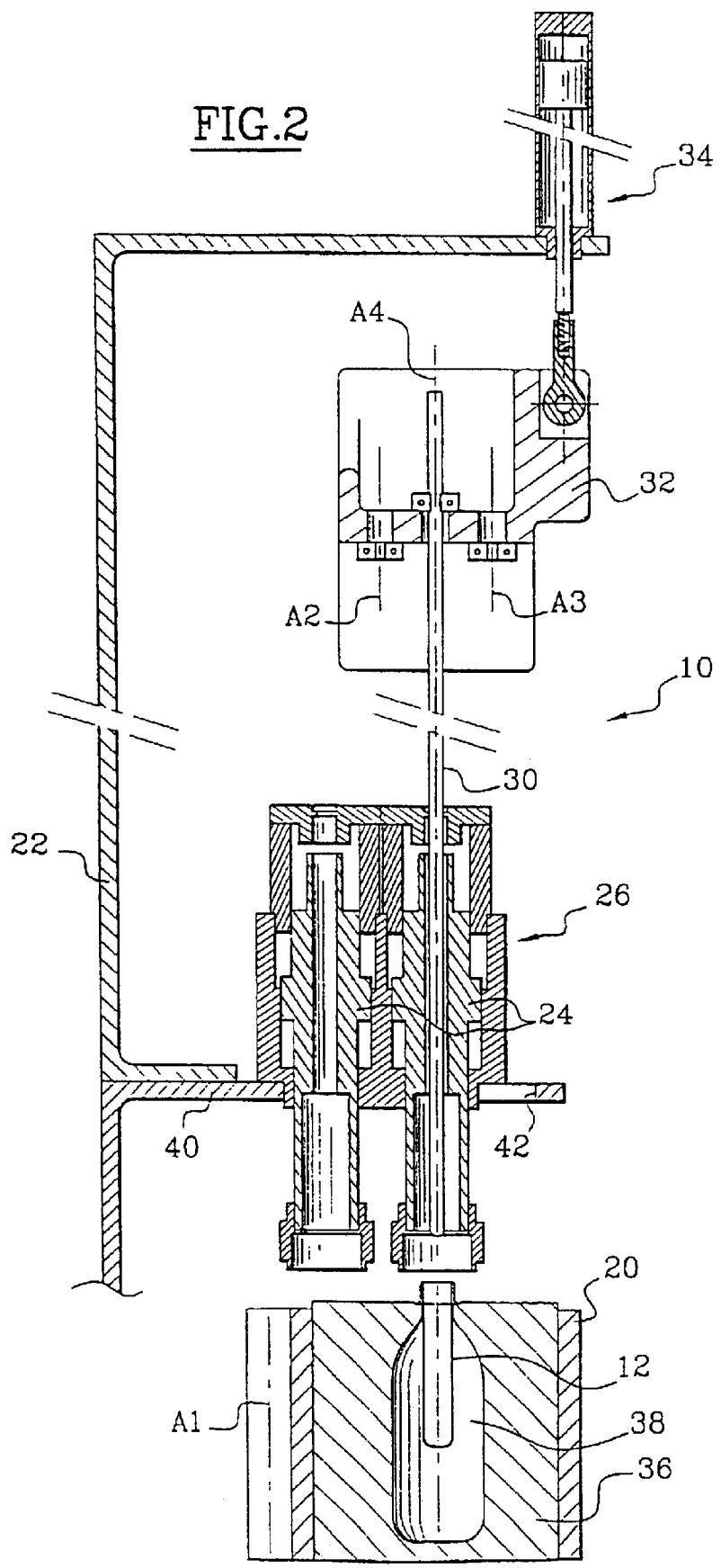
Figure 3:
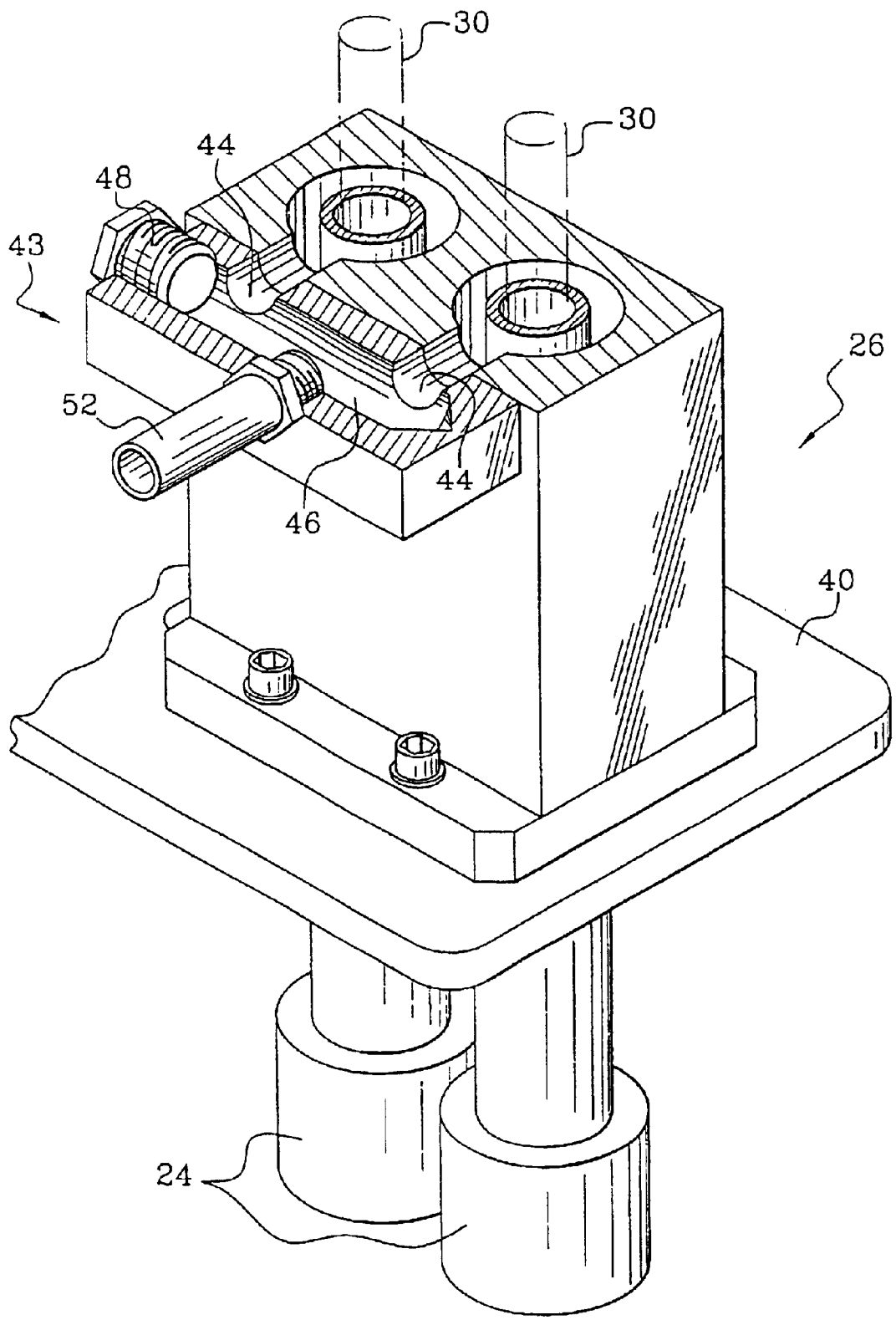
Figure 4:
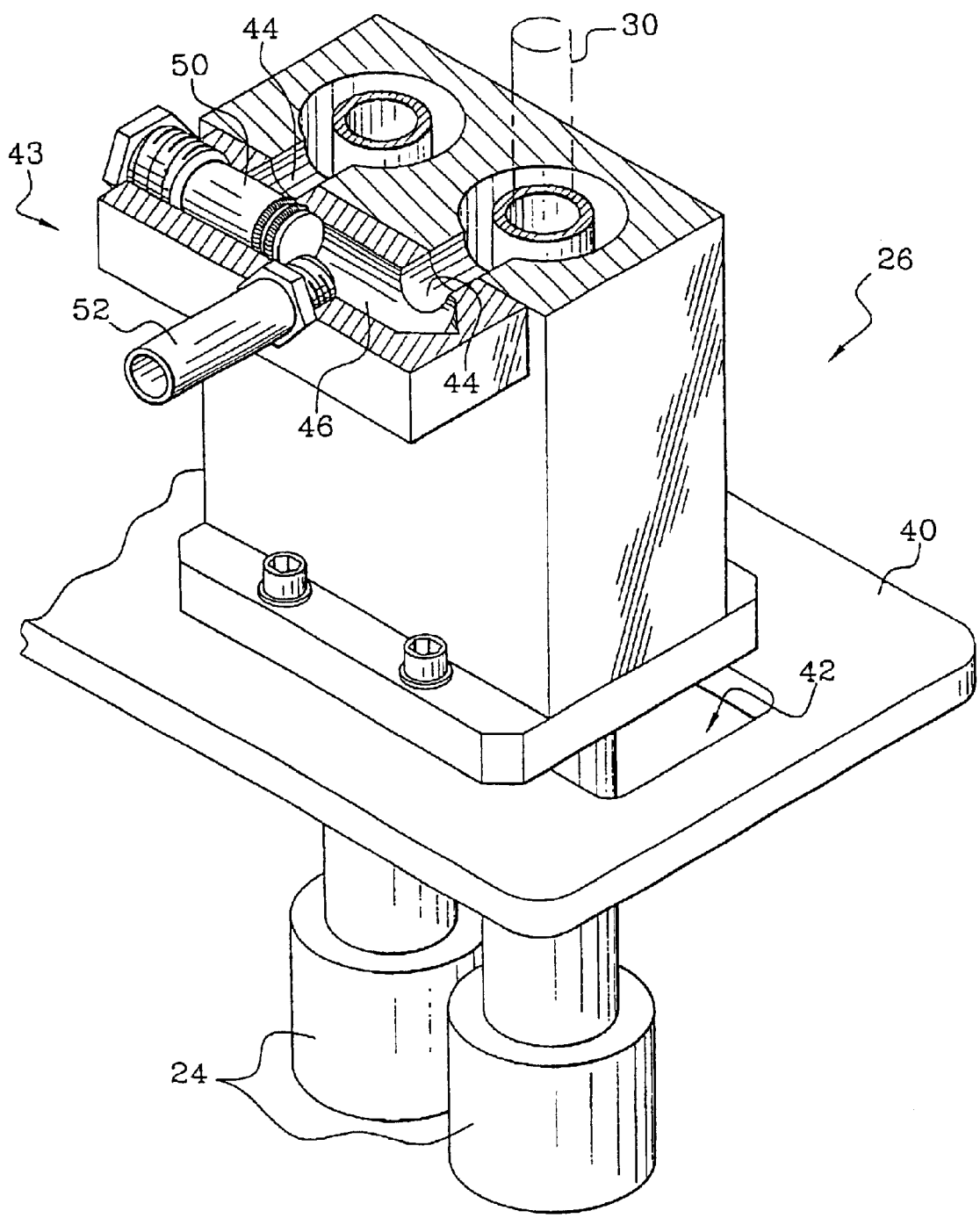

Other characteristics and advantages of the invention will become apparent from the detailed description that follows, as well as in the attached drawings in which:

FIGS. 1 and 2 are diagrammatic views, in partial cross section along a radial plane, of the rotor of a machine according to the invention, in which a blow-molding station is illustrated in two-impression and one-impression configuration, respectively; and FIGS. 3 and 4 are diagrammatic views in perspective of a blow-molding unit of a machine according to the invention, in two-impression and one-impression configuration, respectively.

Represented in FIG. 1 is a blow-molding station 10 intended for a machine to blow-mold containers from preforms 12 previously produced by injection molding.

This station 10 is of the two-impression type allowing two containers to be produced simultaneously from two preforms 12 simultaneously engaged in a two-impression mold 16 carried by a mold carrier unit 20 of the station 10. The mold 16 is in two parts, each part having two semi-cavities 18 in the shape of the container to be produced. The mold carrier unit 20 is also in two parts, each of which carries one part of the mold 16. The two parts of the mold carrier unit 20 are, for example, articulated around an axis A1 both with respect to each other as well as to a frame 22 of the blow-molding station 10. The blow-molding station 10 is preferably part of a rotor of a rotary machine comprising several identical blow-molding stations, the rotor being driven in a continuous rotational movement around an axis A0.

As can be seen in the figures, the axes A0 and A1 are parallel and define a radial plane of the rotor of the machine. This radial plane, which is the plane of FIGS. 1 and 2, is also the joint plane of the two parts of the mold 16.

In the illustrated example, it can be seen that the cavities 18 of the mold 16 are arranged along axes A2 and A3 contained in the radial plane, parallel to the axes A0 and A1, and they are offset along the radial direction. The two cavities are arranged in the mold so that they are appreciably symmetrical on either side of a principal axis A4, appreciably central, of the mold 16 and of the mold carrier 20.

For the clarity of the description, the axes A0 to A4 will be considered to be vertical and the containers are molded with their open end upward as represented in the figures. However, this arbitrary choice should not be considered as a limitation to the scope of the invention.

The compressed air used for blow-molding the containers is fed to the preforms 12 held in the mold by blow nozzles 24 which are axially movable between an upper retracted position, as illustrated in the figures, and a lower position, not represented, in which the nozzles can sealably cooperate with the preforms. In the illustrated example, the nozzles have a lower bell-shaped end that is intended to press sealably against an upper face of the mold 16, around the open end of the preform 12 which extends above said upper face of the mold 16.

In the illustrated example, each nozzle 24 is made in the form of an independent sliding part that is mounted in a blow-molding unit 26. The movements of the two nozzles are controlled independently. In this instance, each nozzle 24 forms a piston that delimits in the blow-molding unit 26 chambers of variable volume. The axial movements of the nozzles can be controlled by feeding compressed air into these chambers.

It can be seen that the two nozzles 24 are arranged respectively along the axes A2 and A3 of the cavities 18 of the two-impression mold.

Moreover, the blow-molding station has two drawing rods 30 that are arranged along the axes A2 and A3, each of which rods can slide through one of the nozzles 24. The removable upper ends of the rods 30 are attached to a carriage 32 that slides axially with respect to the frame 22 and which is controlled by a drawing cylinder 34. During the blow-molding, the drawing cylinder 34 causes the carriage 32 to descend so that the lower end of the rods 30 engages inside the respective preform 12 to control the axial drawing of that preform.

According to the invention, the blow-molding station 10 is designed to be able to change over easily from a two-impression configuration, as has just been described, to a one-impression configuration in which only one container is produced per mold and per cycle.

Thus, as can be seen in FIG. 2, the mold carrier unit 20 can receive, without being modified or moved, a one-impression mold 36 that has only one cavity 38. The cavity 38 is then preferably arranged appreciably at the center of the mold, along the principal axis A4, in such a way as to increase the available volume while still preserving a nearly symmetrical distribution of the material in the mold 36.

With such a mold, it would be impossible to use the blow-molding unit 26 in its configuration of FIG. 1 because the axis A4 of the cavity 38 does not coincide with either of the two axes A2 and A3 of the nozzles 24 in a two-impression configuration. Also, according to the invention, the blow-molding unit 26 can be moved simply by sliding it in the radial direction so as to move the axis of one of the two nozzles 24 to correspond with the axis A4 of the cavity 38. This nozzle, called active, will be the only one operational in this one-impression configuration of the blow-molding unit 26. The other nozzle, called passive, is intended to be immobilized in its upper retracted position.

It can be seen in the figures that the blow-molding unit 26 is mounted on a horizontal plate 40 of the frame 22. This plate has an opening 42 made in it through which the nozzles 24 extend downward toward the molding unit. The opening 42 is elongated in the radial direction to allow the blow-molding unit to be changed from one to the other of its two positions. The blow-molding unit 26, therefore, has transverse flanges that rest on the plate 40 and, for example, the block can be mounted by screws in one or the other of its two positions. Preferably the edges of the opening 42 guide the block, but additional means (not represented) can also be anticipated to ensure the precise positioning of the block in each of its two positions.

FIGS. 3 and 4 diagrammatically represent the blow-molding unit according to the invention, as well as the means that make it possible to inhibit the feed of the passive nozzle with compressed air. In the illustrated blow-molding unit, the blow-molding air under high pressure is injected, for each nozzle, into an upper chamber delimited in the blow-molding unit by this nozzle.

More specifically, the blow-molding unit 26 has an air distributor 43 which is integral with the unit 26 and which is connected by an intake port 52 to the source of compressed air, and to each of the two nozzles 24 through two orifices 44, The distributor thus has a cylindrical distribution channel 46 into which the two orifices 44 open as well as the intake port 52 connected to the source of compressed air. This channel 46 is blocked at one end by an interchangeable plug.

In the two-impression configuration, the plug is a short plug 48 which only prevents the compressed air from escaping directly to the outside but does not block either the orifices 44 or the intake port 52.

However, as can be seen in FIG. 4, the plug used in one-impression configuration is a long plug 50 that extends into the channel 46 in such a way that it also blocks the orifice 44 that communicates with the passive nozzle. Of course, the long plug does not block either the second orifice 44 or the intake port 52. Thus, isolating the passive nozzle from the source of compressed air prevents any unnecessary consumption of air.

In the illustrated example, the blow-molding unit is made from one single piece. However, the block can also be made from two separate nozzle holders that can be moved between two positions.

According to another aspect of the invention, it can be seen that the carriage 32 has a third attachment means for receiving a drawing rod 30 according to a position arranged on the axis A4. In the one-impression configuration, the two rods used in the two-impression configuration are removed in order to replace them with a single rod placed at the third position. This rod then extends along the axis A4 through the active nozzle. Because of this arrangement, it is not necessary to move the carriage 32 or the drawing cylinder 34 when changing the blow-molding station 10 s from one configuration to another.

Thanks to the invention, it is therefore easy to use the machine with either one-impression molds or two-impression molds. Apart from the molds, no specific part is required, with the possible exception of a drawing rod of different length. The change of configuration is accomplished simply by moving the blow-molding unit, without the need for connecting different pneumatic lines that connect it to the different circuits of the machine, if it is decided to use flexible lines.

Thus, a low-cost machine is obtained that is capable of producing, under optimal technical and economical conditions, containers of very different volumes.

What is claimed is:

1. Rotary machine for blow-molding containers made of thermoplastic material from a previously injected preform, of the type having several blow-molding stations (10) mounted on a rotor driven continuously in rotation, of the type in which each blow-molding station has a mold carrier unit (20) that can carry a two-impression mold (16) having two mold cavities (18) each of which is intended to receive a preform (12), of the type in which each blow-molding station has a blow-molding unit (26) furnished with two blow-molding nozzles (24) that can inject the pressurized fluid into the preforms (12) in order to mold the containers, and of the type in which the blow-molding unit (26) is mounted on a frame element (22) of the blow-molding station in such a way that the two nozzles (24) are arranged on either side of the principal axis (A4) of the mold-carrier unit (20), in correspondence with the principal axes (A2, A3) of the two molding cavities (18), characterized in that the machine can be changed over to a one-impression configuration in which the mold-carrier unit (20) carries a one-impression mold (36) comprising a single mold cavity (38) the axis of which is appreciably the same as the principal axis (A4) of the mold-carrier unit (20), and in that the blow-molding unit (26) has a second mounting position on the frame element in which the first of two nozzles (24), called the active nozzle, is arranged in correspondence with the principal axis (A4) of the only molding cavity (38) of the one-impression mold (36).

2. Blow-molding machine according to claim 1, characterized in that the blow-molding unit (26) is moved by sliding between its two mounting positions on the frame (22).

3. blow-molding machine according to claim 1, characterized in that the blow-molding station (10) has means (50) for inhibiting the second nozzle, called the passive nozzle, so that it is isolated from the source of pressurized fluid.

4. Blow-molding machine according to claim 3, characterized in that both nozzles (24) are fed by pressurized fluid from a common source through a distributor (43) that is incorporated into the blow-molding unit (26), and the distributor has means (50) for isolating the passive nozzle from the source of pressurized fluid.

5. Blow-molding machine according to claim 1, characterized in that the nozzles (24) are movable with respect to the blow-molding unit (26) between a retracted position and a blow-molding position, and in that the one-impression configuration the second nozzle, called the passive nozzle, is immobilized in retracted position.

6. Blow-molding according to claim 1, characterized in that during the blow-molding, each preform (12) is drawn with a drawing rod (30) which is axially engaged inside the preform, through the respective blow-molding nozzle (24), in that the blow-molding station (10) has a drawing carriage (32) that is guided axially on the frame element (22), and in that the carriage (32) has a first and second mounting location each intended to receive a drawing rod (30) when the machine is in the two-impression configuration, and a third mounting location that is used exclusively to receive a drawing rod (30) when the machine is in the one-impression configuration, said location being aligned with the principal axis (A4) of the mold carrier unit (20).

\* \* \* \* \*